US008772964B2

(12) United States Patent
Beg et al.

(10) Patent No.: US 8,772,964 B2
(45) Date of Patent: Jul. 8, 2014

(54) PARALLEL CONTROL AND PROTECTION FOR UPS

(75) Inventors: Mirza Akmal Beg, Pepperell, MA (US); Eyob Demissie, Lowell, MA (US); Venkatraman Chennakesavan, Groton, MA (US); Michael J. Ingemi, Norwood, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 340 days.

(21) Appl. No.: 13/235,636

(22) Filed: Sep. 19, 2011

(65) Prior Publication Data

US 2013/0069434 A1     Mar. 21, 2013

(51) Int. Cl.
*H02J 9/00*     (2006.01)

(52) U.S. Cl.
USPC .......................................................... 307/66

(58) Field of Classification Search
USPC .......................................................... 307/66
See application file for complete search history.

(56) References Cited

U.S. PATENT DOCUMENTS

| | | | |
|---|---|---|---|
| 6,292,379 B1 | 9/2001 | Edevold et al. | |
| 6,396,170 B1 | 5/2002 | Laufenberg et al. | |
| 6,493,243 B1 | 12/2002 | Real | |
| 6,774,604 B2 * | 8/2004 | Matsuda et al. | 320/110 |
| 7,061,141 B2 | 6/2006 | Yamamoto | |
| 7,652,390 B2 * | 1/2010 | Vrla et al. | 307/1 |
| 8,552,580 B2 * | 10/2013 | Tackett | 290/55 |
| 2005/0043859 A1 | 2/2005 | Tsai et al. | |
| 2005/0073783 A1 | 4/2005 | Luo et al. | |
| 2006/0167569 A1 | 7/2006 | Colombi et al. | |

OTHER PUBLICATIONS

Notification of Transmittal of the International Search Report and the Written Opinion of the International Searching Authority from corresponding PCT/US2012/055820 mailed Feb. 21, 2013.
Strzelecki R et al: "Decentralized control of a UPS systems operating in parallel", Electronics Conference, 2008. BEG 2008. 11th International Biennial Baltic, IEEE, Piscataway, NJ, USA, Oct. 6 2008, pp. 297-300, XP031352717, ISBN: 978-1-4244-2059-9.
Tsai-Fu Wu et al: "Current Weighting Distribution Control Strategy for Multi-Inverter Systems to Achieve Current Sharing", IEEE Transactions on Power Electronics, IEEE Service Center, Piscataway, NJ, US, vol. 22, No. 1, Jan. 1 2007, pp. 160-168, XP011154553, ISSN: 0885-8993, DOI: 10.1109/TPEL.2006.886622.

* cited by examiner

*Primary Examiner* — Hal Kaplan
(74) *Attorney, Agent, or Firm* — Lando & Anastasi, LLP

(57) ABSTRACT

According to one aspect, embodiments of the invention provide a method of operating a UPS system having a first UPS, the method comprising powering on the first UPS, detecting a first signal at a first I/O of the first UPS using a first detection circuit of the first UPS, detecting a second signal at a second I/O of the first UPS using a second detection circuit of the first UPS, based on a status of the first signal and a status of the second signal, configuring the first UPS to operate in one of a master mode of operation and a controlled mode of operation.

20 Claims, 9 Drawing Sheets

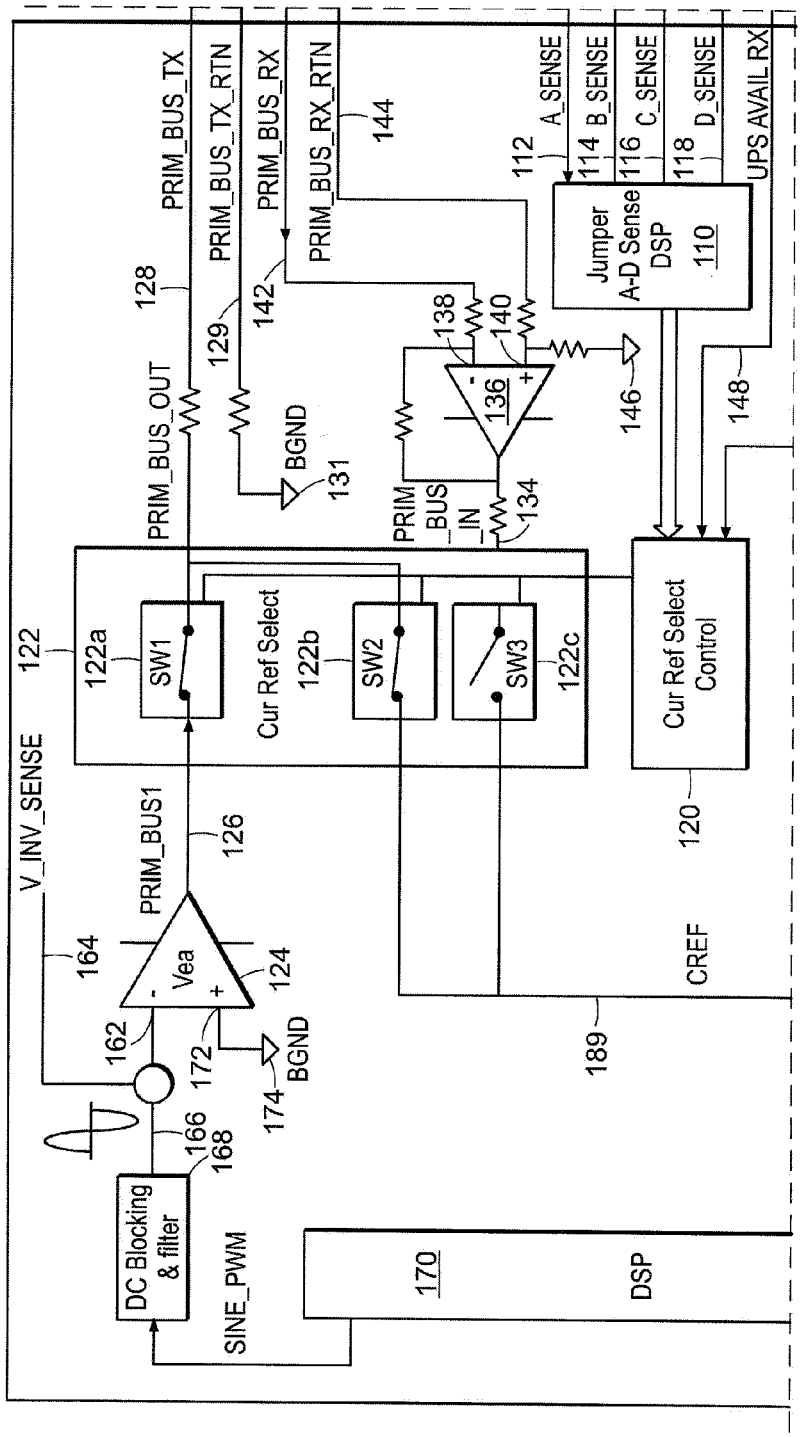

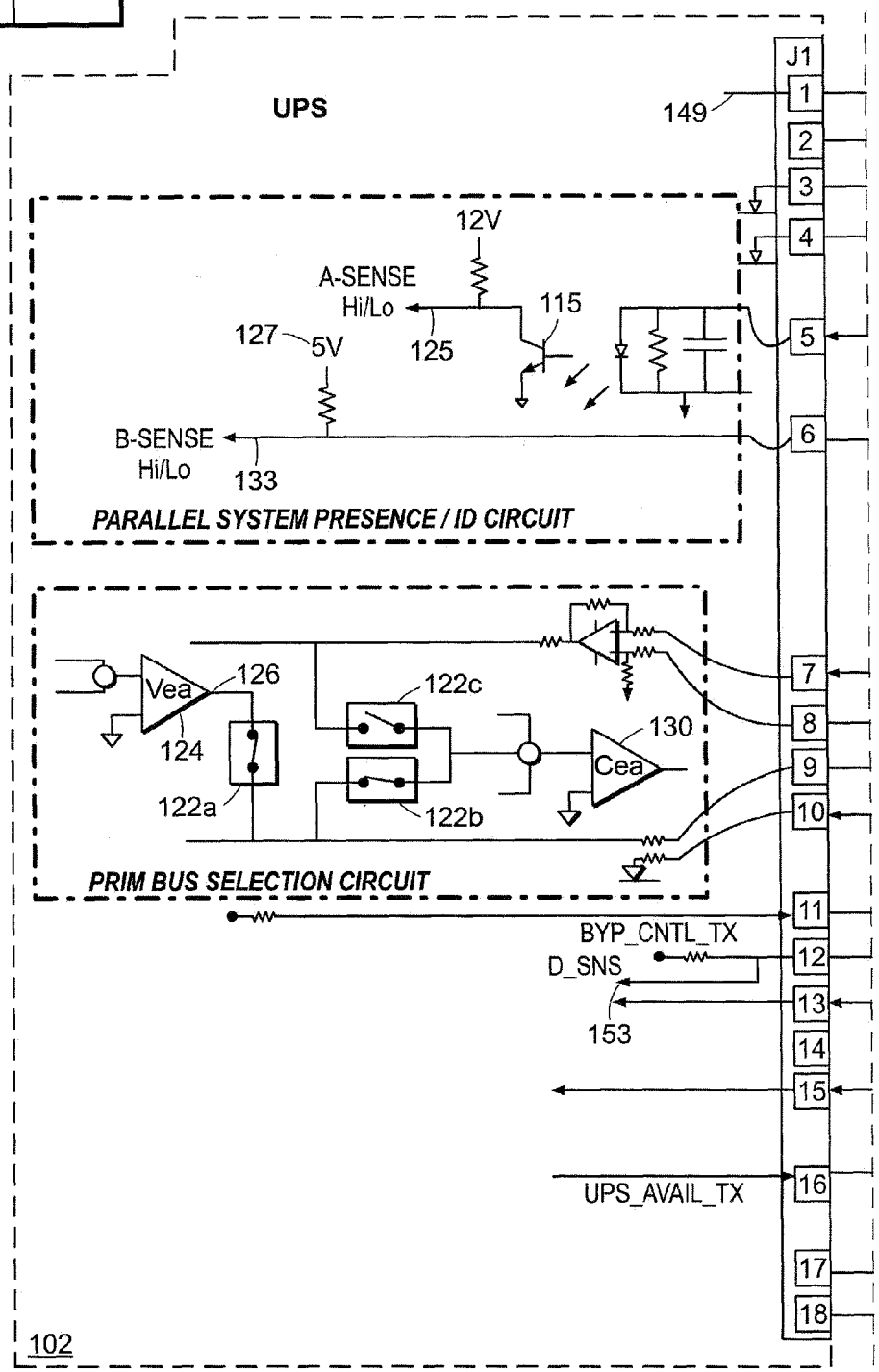

PARALLEL CONTROL AND PROTECTION FOR UPS

BACKGROUND OF INVENTION

1. Field of the Invention

At least one example in accordance with the present invention relates generally to the parallel control of Uninterruptible Power Supplies.

2. Discussion of Related Art

Uninterruptible Power Supplies (UPS) are commonly used to provide regulated, uninterrupted power for sensitive and/or critical loads. There is an increased desire for UPS systems to provide greater capacity and/or reliability. For example, to provide enhanced scalability and/or redundancy, two UPS's may be electrically connected to form a single parallel UPS system with one output. In such a system, the combination of two UPS's may provide increased power capacity to a load attached to the parallel UPS system. Also, if a first one of the UPS's coupled in parallel fails, the second one of the UPS's coupled in parallel may backup for the failed UPS.

SUMMARY OF THE INVENTION

Aspects in accord with the present invention are directed to a method of operating a UPS system having a first UPS and a second UPS. In one aspect, the present invention features a method comprising coupling at least one control line between the first UPS and the second UPS to operate the first UPS and the second UPS in a parallel mode of operation, providing output power from each of the first UPS and the second UPS to a load, detecting a fault condition in the UPS system, decoupling the at least one control line, operating the first UPS in a diagnostic mode of operation, and determining if the fault condition is associated with the first UPS.

According to one embodiment, the method further comprises operating the second UPS in a diagnostic mode of operation, and determining if the fault condition is associated with the second UPS. In another embodiment, determining if the fault condition is associated with the second UPS includes coupling a diagnostic module to the second UPS.

According to another embodiment, coupling at least one control line between the first UPS and the second UPS includes coupling a connection module between the first UPS and the second UPS, and wherein decoupling the at least one control line further includes decoupling the connection module from the first UPS and coupling a diagnostic module to the first UPS. In one embodiment, coupling at least one control line between the first UPS and the second UPS includes coupling a connection module between the first UPS and the second UPS, and wherein decoupling the at least one control line, includes changing a state of the connection module from an operational state to a diagnostic state.

According to one embodiment, operating the first UPS in the diagnostic mode of operation includes disabling a bypass mode of operation of the first UPS. In one embodiment, operating the first UPS in the diagnostic mode of operation includes conducting a self-test of an inverter of the first UPS.

In another aspect, the present invention features a UPS system comprising a first UPS and a second UPS, each of the first UPS and the second UPS including a first input to receive input power from a first power source, a battery configured to provide battery power, an output coupled to provide output power, output power circuitry coupled to the output and configured to provide the output power derived from at least one of the first power source and the battery, a first I/O, a second I/O, and control circuitry coupled to the first I/O and the second I/O, and a connection module coupled to the first I/O, the second I/O and the output of the first UPS and coupled to the first I/O, the second I/O and the output of the second UPS, the connection module having an output that provides output power from at least one of the first UPS and the second UPS, wherein the first UPS is configured to operate in a diagnostic mode based on a signal detected at the second I/O of the first UPS, and configured in the diagnostic mode to determine if a fault of the UPS system is associated with the first UPS.

According to one embodiment, the connection module is configured to operate in a diagnostic mode to couple the first I/O of the first UPS to the second I/O of the first UPS. In another embodiment, the system further comprises a diagnostic module configured to be coupled to the first UPS in the diagnostic mode and configured to couple the first I/O of the first UPS to the second I/O of the first UPS.

According to another embodiment, the first UPS includes an inverter, and wherein the first UPS is configured to conduct an inverter test in the diagnostic mode. In one embodiment, the first UPS is further configured to operate in a bypass mode of operation, and wherein the control circuitry is configured to disable the bypass mode of operation in the diagnostic mode. In another embodiment, the second UPS is configured to operate in a diagnostic mode based on a signal detected at the second I/O of the second UPS, and configured in the diagnostic mode, to determine if a fault of the UPS system is associated with the second UPS.

According to one embodiment, the connection module is configured to operate in a diagnostic mode to couple the first I/O of the second UPS to the second I/O of the second UPS. In another embodiment, the system further comprises a diagnostic module configured to be coupled to the second UPS in the diagnostic mode and configured to couple the first I/O of the second UPS to the second I/O of the second UPS.

In one aspect, the present invention features a UPS system comprising a first UPS and a second UPS, each of the first UPS and the second UPS including a first input to receive input power from a first power source, a battery configured to provide battery power, an output coupled to provide output power, output power circuitry coupled to the output and configured to provide the output power derived from at least one of the first power source and the battery, a first I/O, a second I/O, and control circuitry coupled to the first I/O and the second I/O, and a connection module coupled to the first I/O, the second I/O and the output of the first UPS and coupled to the first I/O, the second I/O and the output of the second UPS, the connection module having an output that provides output power from at least one of the first UPS and the second UPS, and means for detecting a fault in the UPS system and for isolating the fault to one of the first UPS and the second UPS.

According to one embodiment, the means for detecting a fault include means for disabling the output of the first UPS and the output of the second UPS after detection of a fault. In one embodiment, each of the first UPS and the second UPS includes parallel control circuitry for operating the first UPS and the second UPS in a parallel mode of operation, and wherein the means for detecting a fault includes means for detecting a fault in the parallel control circuitry of one of the first UPS and the second UPS.

According to another embodiment, the system further comprises means for establishing one of the first UPS and the second UPS as a master UPS of the UPS system. In one embodiment, the master UPS is configured to control an output of an inverter in the first UPS and an output of an inverter in the second UPS.

In one aspect, the present invention features a method of operating a UPS system having a first UPS, the method comprising powering on the first UPS, detecting a first signal at a first I/O of the first UPS using a first detection circuit of the first UPS, detecting a second signal at a second I/O of the first UPS using a second detection circuit of the first UPS, based on a status of the first signal and a status of the second signal, configuring the first UPS to operate in one of a master mode of operation and a controlled mode of operation.

According to one embodiment, the method further comprises operating the first UPS in the master mode of operation, in the master mode of operation generating in the first UPS an output control signal and providing the output control signal at a third I/O of the first UPS, and controlling operation of an output inverter of the first UPS using the output control signal. According to another embodiment, the method further comprises operating the first UPS in the controlled mode of operation, in the controlled mode of operation, receiving an input control signal at a fourth I/O of the first UPS, and controlling operation of the output inverter of the first UPS using the input control signal.

According to one embodiment, the UPS system further includes a second UPS coupled in a parallel configuration with the first UPS, and wherein the method further includes powering on the second UPS, detecting a third signal at a first I/O of the second UPS using a first detection circuit of the second UPS, detecting a fourth signal at a second I/O of the second UPS using a second detection circuit of the second UPS, based on a status of the third signal and a status of the fourth signal, configuring the second UPS to operate in one of a master mode of operation and a controlled mode of operation.

According to another embodiment, the method further comprises configuring the first, second, third and fourth signals, such that at any given time only one of the first UPS and the second UPS is configured in the master mode of operation and only one of the first UPS and the second UPS is configured in the controlled mode of operation. According to one embodiment, the method further comprises coupling the second I/O of the first UPS to the first I/O of the second UPS, and controlling operation of an output inverter of the second UPS using a control signal generated by the first UPS. In one embodiment, the method further comprises detecting a fifth signal at a fifth I/O of the first UPS, and configuring the first UPS to operate in a stand-alone mode of operation.

In another aspect, the present invention features a UPS comprising a first input to receive input power from a first power source, a second input to receive input power from a second power source, an output coupled to provide output power, output power circuitry coupled to the output and configured to provide the output power derived from at least one of the first power source and the second power source, a first I/O, a second I/O, and control circuitry coupled to the first I/O and the second I/O and configured to control the UPS to operate in one of a master mode of operation and a controlled mode of operation based on first and second control signals at the first I/O and the second I/O, wherein the control circuitry in the master mode of operation is configured to generate a control signal to control the output power circuitry, and in the controlled mode of operation is configured to receive a control signal from an external device to control the output power circuitry.

According to one embodiment, the UPS further comprises a third I/O coupled to the control circuitry and configured to receive a third control signal, and wherein the control circuitry is further configured to operate the UPS in one of a stand-alone mode and a parallel mode based on a status of the third control signal. In another embodiment, the UPS further comprises a bypass switch coupled to the first input, the output and the control circuitry and operable under control of the control circuitry to selectively couple the first input to the output to provide in a bypass mode of operation the input power from the first power source at the output bypassing the output power circuitry.

According to another embodiment, the UPS further comprises a fourth I/O coupled to the control circuitry and configured to receive a fourth control signal, and wherein the control circuitry is further configured to inhibit bypass mode of operation based on a status of the fourth control signal. In another embodiment, the UPS further comprises a fifth I/O coupled to the control circuitry and configured to receive a status signal from a parallel connected UPS, and wherein the control circuitry is configured to change an operational mode of the UPS from controlled mode of operation to master mode of operation based on a state of the status signal.

In one aspect, the present invention features a UPS system comprising a first UPS and a second UPS, each of the first UPS and the second UPS including a first input to receive input power from a first power source, a battery configured to provide battery power, an output coupled to provide output power, output power circuitry coupled to the output and configured to provide the output power derived from at least one of the first power source and the battery, a first I/O, a second I/O, and control circuitry coupled to the first I/O and the second I/O and configured to set a mode of operation as one of a master mode of operation and a controlled mode of operation based on first and second control signals at the first I/O and the second I/O, wherein the control circuitry in the master mode of operation is configured to generate a control signal to control the output power circuitry, and in the controlled mode of operation is configured to receive a control signal from an external device to control the output power circuitry, and a connection module coupled to the first I/O, the second I/O and the output of the first UPS and coupled to the first I/O, the second I/O and the output of the second UPS, the connection module having an output that provides output power from at least one of the first UPS and the second UPS.

According to one embodiment, the connection module is configured to couple the second I/O of the first UPS to the first I/O of the second UPS to configure the first UPS for operation in the master mode of operation and to configure the second UPS in the controlled mode of operation. In another embodiment, the connection module is coupled to the control input and the control output of each of the first UPS and the second UPS and configured to couple the control input of the first UPS to the control output of the second UPS and to couple the control output of the first UPS to the control input of the second UPS.

According to another embodiment, each of the first UPS and the second UPS further includes a control input configured to receive the control signal from the connection module in the controlled mode of operation and a control output to provide the control signal in the master mode of operation. In one embodiment, each of the first UPS and the second UPS includes a bypass switch coupled to the input, the output and the control circuitry and operable under control of the control circuitry to selectively couple the input to the output to provide in a bypass mode of operation the input power from the first power source at the output bypassing the output power circuitry.

According to one embodiment, each of the first UPS and the second UPS includes a bypass input coupled to the control circuitry and configured to receive a bypass control signal, and wherein the control circuitry is further configured to inhibit bypass mode of operation based on a status of the fourth control signal. In another embodiment, each of the first UPS and the second UPS includes a bypass output, and wherein the connection module is configured to couple the bypass input of the first UPS to the bypass output of the second UPS and to couple the bypass output of the first UPS to the bypass input of the second UPS. In one embodiment, each of the first UPS and the second UPS includes a status input coupled to the control circuitry and configured to receive a status signal from the connection module, and wherein the control circuitry is configured to change an operational mode of the UPS from the controlled mode of operation to the master mode of operation based on a state of the status signal.

In one aspect, the present invention features a method of operating a UPS system having a first UPS and a second UPS coupled in parallel to provide output power to a load from a power source, each of the first UPS and the second UPS having an inverter and having a bypass switch, with each UPS configured to operate in one of an inverter mode in which output power is derived from the power source through the inverter, and a bypass mode in which output power is derived from the power source bypassing the inverter, the method comprising powering on the first UPS and the second UPS in the inverter mode of operation, designating one of the first UPS and the second UPS as a master UPS, and controlling the bypass switch of the first UPS and the bypass switch of the second UPS using the master UPS.

According to one embodiment, the method further comprises controlling output current of the inverter of the first UPS and the output current of the inverter of the second UPS using the master UPS. In another embodiment, the method further comprises detecting that the bypass mode is not available for the first UPS, and in response, preventing the first UPS from entering bypass mode. In one embodiment, the method further comprising coupling a connection module between the first UPS and the second UPS.

According to another embodiment, coupling a connection module includes coupling first and second bypass control lines between the first UPS and the second UPS. In one embodiment, designating one of the first UPS and the second UPS as a master UPS includes designating the first UPS as the master UPS, and wherein the method further includes detecting a failure in the first UPS, and in response, designating the second UPS as the master UPS, and controlling output current of the inverter in the second UPS using at least one control signal generated by the second UPS. In another embodiment, designating one of the first UPS and the second UPS as a master UPS includes designating the first UPS as the master UPS, and wherein the method further includes receiving at the first UPS a request from the second UPS to operate in bypass mode, controlling the first UPS to enter bypass mode, and providing a control signal to the second UPS to control the second UPS to enter bypass mode.

In another aspect, the present invention features a UPS comprising a first input to receive input power from a first power source, a second input to receive input power from a second power source, an output coupled to provide output power, an inverter coupled to the output and configured to provide the output power derived from at least one of the first power source and the second power source, a bypass switch coupled to the first input and the second input and configured to bypass the inverter in a bypass mode of operation, a first I/O, a second I/O, control circuitry configured to control the UPS to operate in one of a master mode of operation and a controlled mode of operation and configured in the master mode of operation to control the bypass switch and provide a signal at the first I/O to control a second UPS, and configured in the controlled mode of operation to control the bypass switch based on a control signal received at the second I/O.

According to one embodiment, the control circuitry is further configured to control output current of the inverter in the master mode of operation, and provide an output signal to control output current of the second UPS in the master mode of operation. In one embodiment, the control circuitry is configured to detect that a bypass mode is not available for the second UPS, and in response, prevent the UPS from entering the bypass mode of operation. In another embodiment, the control circuitry is configured to receive an input signal from the second UPS indicating a failure of the second UPS, and in response change a mode of operation of the UPS from the controlled mode of operation to the master mode of operation. In another embodiment, the control circuitry is further configured to receive a request from the second UPS to operate in bypass mode, and in response, control the UPS to enter bypass mode, and provide a control signal to the second UPS to control the second UPS to enter bypass mode.

In one aspect, the present invention features a UPS system comprising a first UPS and a second UPS, each of the first UPS and the second UPS including a first input to receive input power from a first power source, a second input to receive input power from a second power source, an output coupled to provide output power, an inverter coupled to the output and configured to provide the output power derived from at least one of the first power source and the second power source, a bypass switch coupled to the first input and the second input and configured to bypass the inverter in a bypass mode of operation, a first I/O, a second I/O, control circuitry configured to set a mode of operation to one of a master mode of operation and a controlled mode of operation and configured in the master mode of operation to control the bypass switch and provide a signal at the first I/O to control a second UPS, and configured in the controlled mode of operation to control the bypass switch based on a control signal received at the second I/O, and a connection module coupled to the first I/O, the second I/O and the output of the first UPS and coupled to the first I/O, the second I/O and the output of the second UPS, the connection module having an output that provides output power from at least one of the first UPS and the second UPS.

According to one embodiment, the control circuitry of each of the first UPS and the second UPS is configured in master mode of operation to control output current of the inverter in the first UPS and to control output current of the inverter in the second UPS. In one embodiment, the control circuitry in the first UPS is further configured to detect that the second UPS is operating in master mode and unable to operate in bypass mode, and in response, prevent the first UPS from entering bypass mode.

According to another embodiment, the connection module is configured to receive input power and provide the input power to the first UPS and the second UPS. In one embodiment, the control circuitry in the second UPS is configured to detect a failure in the first UPS, and in response, designate the second UPS as the master UPS, and control output current of the inverter in the second UPS. In another embodiment, the control circuitry in the first UPS is configured to detect a failure in the second UPS, and in response, designate the first UPS as the master UPS, and control output current of the inverter in the first UPS.

According to one embodiment, the control circuitry in the second UPS is further configured to detect that the first UPS is operating in master mode and unable to operated in bypass mode, and in response, prevent the second UPS from entering bypass mode. In another embodiment, the control circuitry in the first UPS is further configured to receive a request from the second UPS to operate in bypass mode, control the first UPS to enter bypass mode, and provide a control signal to the second UPS to control the second UPS to enter bypass mode.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1B:
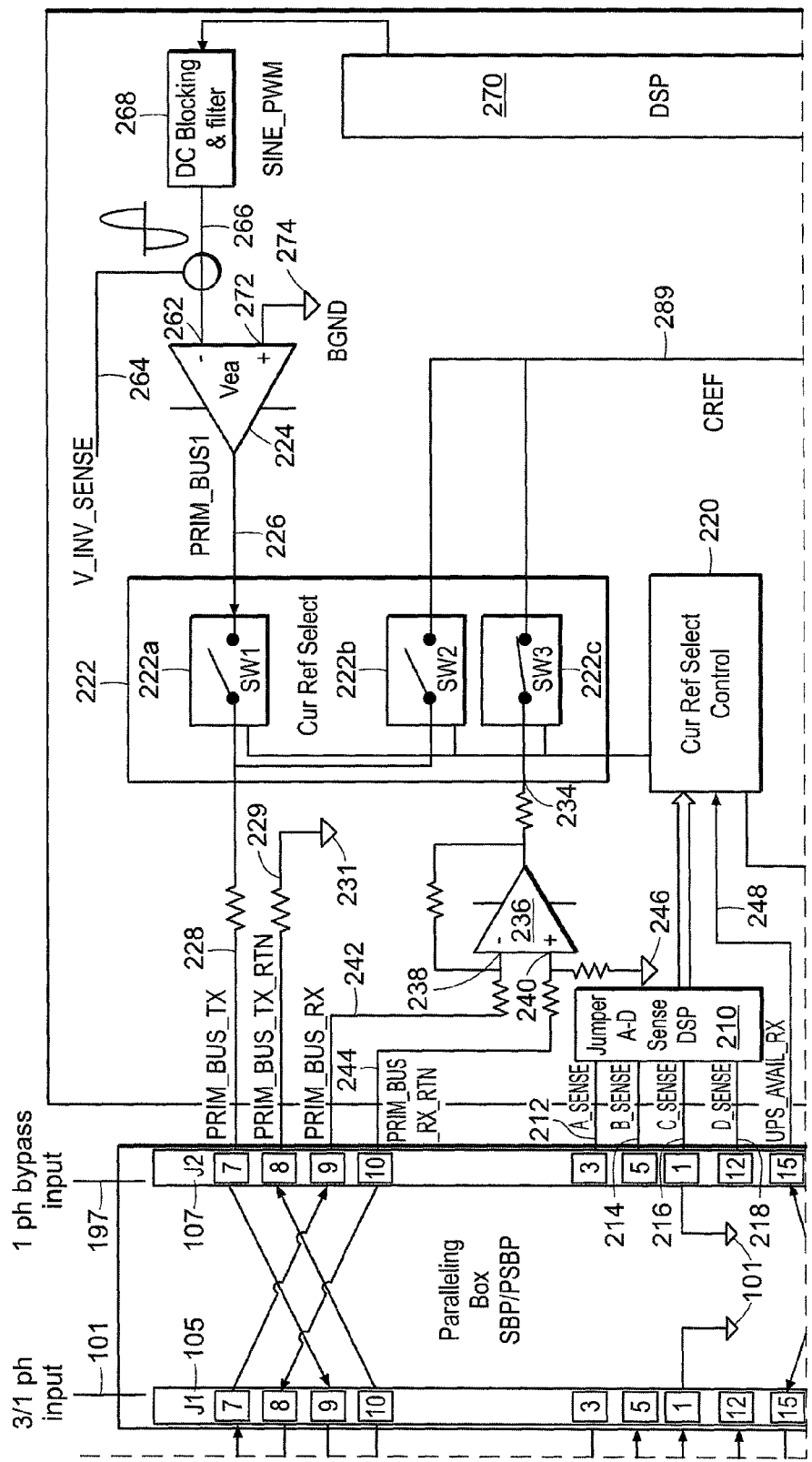
FIG. 1 is a circuit diagram of a parallel UPS system in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, to provide enhanced scalability and/or redundancy, two UPS's may be electrically connected to form a single parallel UPS system with one output configured to be coupled to a load. In typical parallel UPS systems, the two UPS's may communicate with each other (e.g., via a bus) to manage their joint operation in the parallel UPS system. In such a system, before the parallel UPS system is able to operate, the two UPS's may need to exchange initial startup information to define how the two UPS's will interact. These initial startup communications may cause delay in the operation of the parallel UPS system, and may require complex communication circuitry in each UPS.

At least some embodiments described herein provide a parallel UPS system in which a first UPS and a second UPS, coupled in parallel, are capable of providing power to a load using a master/controlled approach without the need for complex communications occurring between the two UPS's. In this way, the parallel UPS system can provide more immediate power to a load. In addition, as described below, at least some parallel UPS systems of the present invention also provide additional enhanced functionality.

Figure 1C:
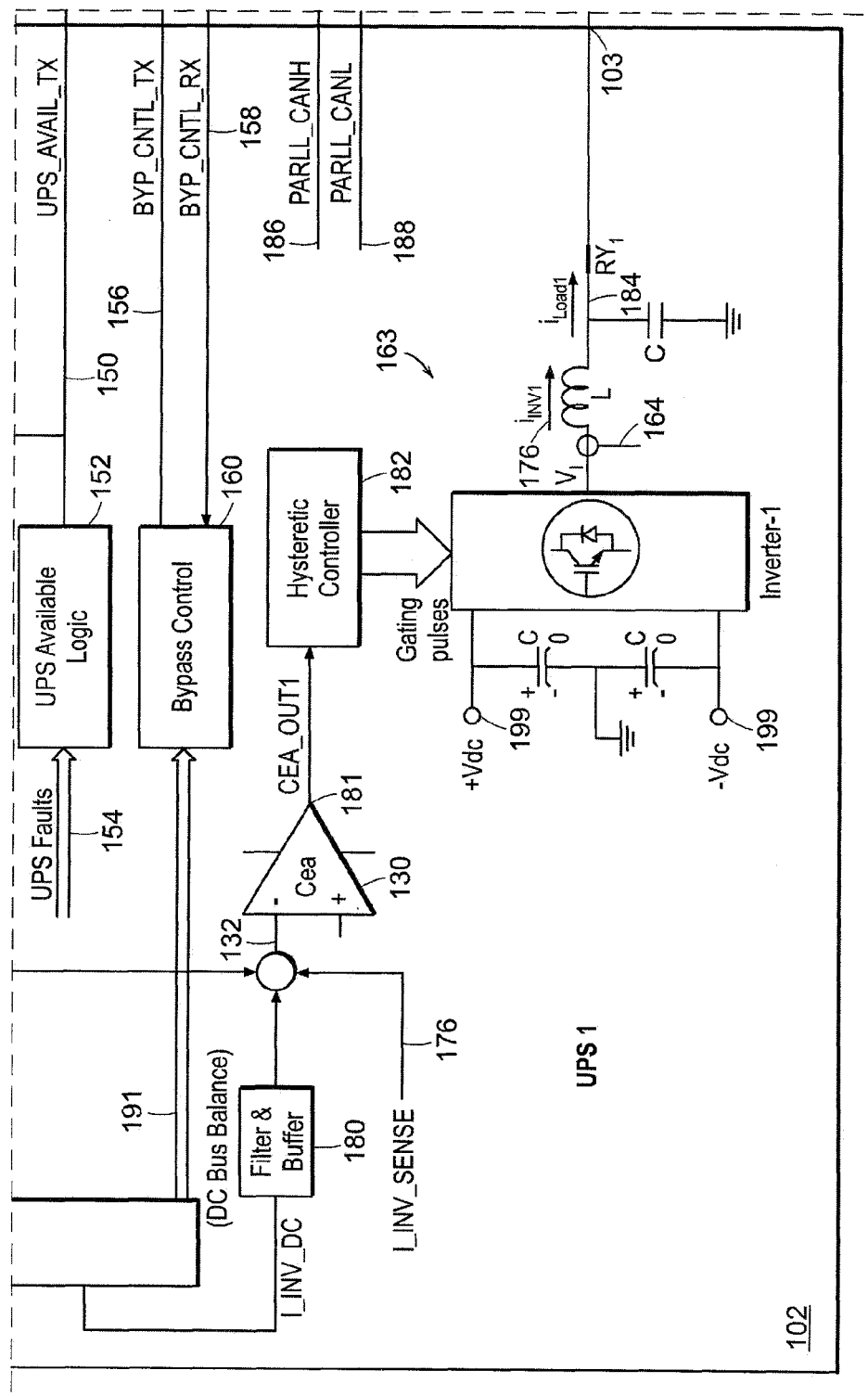
Figure 1D:
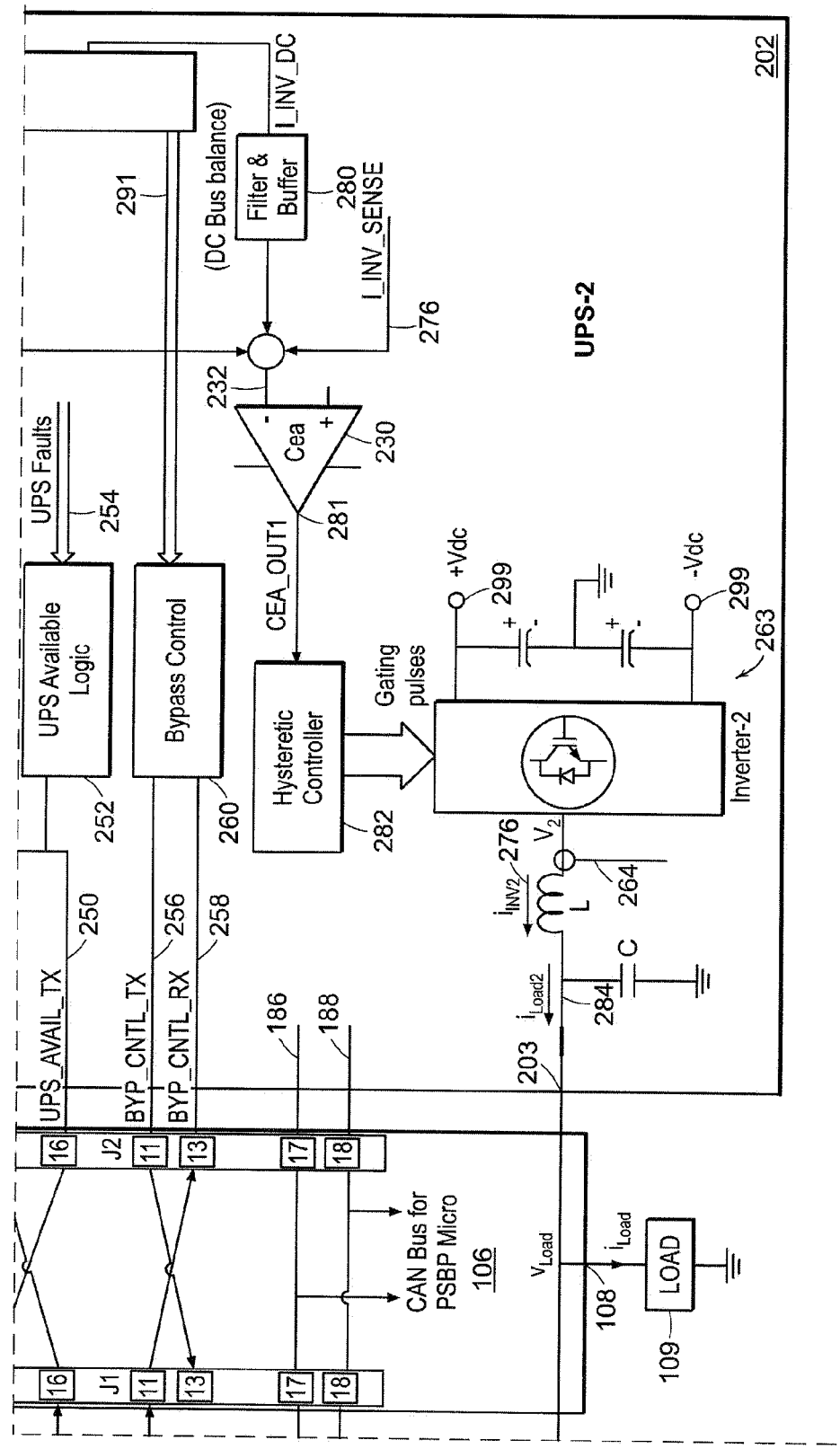

FIG. 1 is a circuit diagram of a parallel UPS system 100 in accordance with aspects of the present invention. The parallel UPS system 100 includes a first UPS 102 and a second UPS 202. Both the first UPS 102 and the second UPS 202 are configured to be coupled in parallel via a connection module 106 (e.g. an SBP (Service Bypass Panel) or PSBP (Parallel Service Bypass Panel)). According to one embodiment, the connection module 106 includes a first input 101 configured to be coupled to an external power source. The external power source may be a single or three-phase power source. The connection module 106 also includes a second input 197 configured to be coupled to a bypass external power source, however, in other embodiments, the bypass power source may be a three phase source. In one embodiment, the bypass external power source is a single phase power source. In one embodiment, both the first input 101 and the second input 197 may be coupled to the same single phase or three phase power source.

The connection module 106 is coupled to an output 103 of the first UPS 102 and an output 203 of the second UPS 202. An output 108 of the connection module 106 is coupled to both the first UPS output 103 and the second UPS output 203. The output 108 is also coupled to an external load 109. The connection module 106 functions to provide power to each UPS, receive output power from each UPS, and provide output power to one or more loads. As discussed below, the connection module 106 also provides additional functionality related to control of each UPS.

The specific components of the first UPS 102 will now be described in greater detail. The first UPS 102 is substantially the same as the second UPS 202 and like components are labeled using similar reference numbers, except that reference numbers for components of the first UPS start with the number one and reference numbers for components of the second UPS start with the number two.

The first UPS 102 includes a master/controlled detection circuit 110 coupled to a current reference select control circuit 120. The current reference select control circuit 120 is also coupled to a UPS available detection circuit 152 and a current reference select switch bank 122. The current reference select switch bank 122 is coupled to a Voltage error amplifier (Vea) 124 and a Current error amplifier (Cea) 130. The Vea 124 is coupled to a Digital Signal Processor (DSP) 170 via a DC blocking and filter circuit 168 and an inverter 163. The Cea 130 is coupled to the DSP 170 via a filter and buffer circuit 180 and the inverter 163. The DSP 170 is also coupled to a bypass control circuit 160. The Cea 130 is coupled to an inverter controller 182 and the inverter controller 182 is coupled to the inverter 163. The inverter is coupled to a ±DC bus 199 and to an output 103 of the UPS 102.

The master/controlled detection circuit 110 is configured to receive four jumper sense signals via four jumper sense Input/Output's (I/O's) (e.g., A sense 112, B sense 114, C sense 116, and D sense 118) coupled to the connection module 106. As described herein, the master/controlled detection circuit 110 receives four jumper sense signals from four jumper sense I/O's; however, in other embodiments, the master/controlled detection circuit may be configured to receive any number of jumper sense signals from any number of jumper sense I/O's. Upon the first UPS 102 being coupled to the connection module 106 via a first connector 105 and the second UPS 202 being coupled to the connection module 106 via a second connector 107, the B sense I/O 114 is coupled to the A sense I/O 212 and both C sense I/O's 116, 216 are coupled to ground.

The current reference select switch bank 122 includes three switches (e.g., SW1 122a, SW2 122b and SW3 122c), each coupled to the current reference select control circuit 120. However, in other embodiments, the current select switch bank 122 may include any number of switches. SW1 122a is coupled between the output 126 of the voltage error amplifier (Vea) 124 and a primary bus transmit I/O 128. When SW1 112a is closed, the output 126 of the Vea 124 is coupled to the primary bus transmit I/O 128. The first UPS 102 also includes a primary bus transmit return I/O 129 which is coupled to ground 131.

SW2 122*b* is coupled between the negative input terminal 132 of the current error amplifier (Cea) 130 and the primary bus transmit I/O 128. When SW2 122*b* is closed, the negative input terminal 132 of the Cea 130 is coupled to the primary bus transmit I/O 128. SW3 122*c* is coupled between the output 134 of an amplifier 136 and the negative input terminal 132 of the Cea 130. When SW3 122*c* is closed, the output 134 of the amplifier 136 is coupled to the negative input terminal 132 of the Cea 130. The negative input terminal 138 of the amplifier 136 is coupled to the output 134 of the amplifier 136 and a primary bus receive I/O 142. The positive input terminal 140 of the amplifier 136 is coupled to a primary bus receive return I/O 144 and to ground 146.

Upon the first UPS 102 being coupled to the connection module 106 via the first connector 105 and the second UPS 202 being coupled to the connection module 106 via the second connector 107, the primary bus transmit I/O 128 is coupled to the primary bus receive I/O 242, the primary bus transmit return I/O 129 is coupled to the primary bus receive return I/O 244, the primary bus receive I/O 142 is coupled to the primary bus transmit I/O 228, and the primary bus receive return I/O 144 is coupled to the primary bus transmit return I/O 229.

According to one embodiment, the primary bus transmit I/O 128 is configured to provide a PRIM_BUS_TX signal from the output 126 of the Vea 124 to the second UPS 202. According to one embodiment, the primary bus receive I/O 142 is configured to receive a PRIM_BUS_RX signal from the second UPS 202 and provide the PRIM_BUS_RX signal to the Cea 130.

The UPS available detection circuit 152 is coupled to a UPS available transmit I/O 150 and the current reference select control circuit 120. According to one embodiment, the UPS available transmit I/O 150 is configured to provide a UPS_AVAIL_TX signal from the UPS available detection circuit 152 to the current reference select control circuit 120 and the second UPS 202. A UPS available receive I/O 148 is coupled to the current reference select control circuit 120. According to one embodiment, the UPS available receive I/O 148 is configured to receive a UPS_AVAIL_RX signal from the second UPS 202 and provide the UPS_AVAIL_RX signal to the current reference select control circuit 120. The UPS available detection circuit 152 is also configured to receive UPS fault signals 154. Upon the first UPS 102 being coupled to the connection module 106 via the first connector 105 and the second UPS 202 being coupled to the connection module 106 via the second connector 107, the UPS available receive I/O 148 is coupled to the UPS available transmit I/O 250 and the UPS available transmit I/O 150 is coupled to the UPS available receive I/O 248.

The bypass control circuit 160 is coupled to the DSP 170, a bypass control transmit I/O 156 and a bypass control receive I/O 158. According to one embodiment, the bypass control transmit I/O 156 is configured to provide a BYP_CNTL_TX signal from the bypass control circuit 160 to the second UPS 202. According to one embodiment, the bypass control receive I/O is configured to receive a BYP_CNTL_RX signal from the second UPS 202 and provide the BYP_CNTL_RX signal to the bypass control circuit 160. Upon the first UPS 102 being coupled to the connection module 106 via the first connector 105 and the second UPS 202 being coupled to the connection module 106 via the second connector 107, the bypass control transmit I/O 156 is coupled to the bypass control receive I/O 258 and the bypass control receive I/O 158 is coupled to the bypass control transmit I/O 256.

The negative input terminal 162 of the Vea 124 is coupled to an inverter voltage sense line 164 from the inverter 163 and to the DSP 170 via the DC blocking and filtering circuit 168. The positive input terminal 172 of the Vea 124 is coupled to ground 174. In addition to switches SW2 122*b* and SW3 122*c*, the negative input terminal 162 of the Cea 130 is also coupled to an inverter current sense line 176 from the inverter 163 and to the DSP 170 via the filtering and buffer circuit 180.

The output 181 of the Cea 130 is coupled to the inverter controller 182. According to one embodiment, the inverter controller 182 is a hysteretic controller; however, in other embodiments the inverter controller 182 may be any known controller scheme. The controller 182 is coupled to the inverter 163 and the output 184 of the inverter is coupled to the load 109 via the output 103 of the first UPS 102 and the output 108 of the connection module 106.

According to one embodiment, the parallel UPS system 100 includes a Controller Area Network bus (CAN bus) coupled between the first UPS 102, the second UPS 202 and the connection module 106. For example, a CAN high bus line 186 and a CAN low bus line 188 may be coupled between the first UPS 102 and the second UPS 202 via the connection module 106. Both CAN bus lines 186, 188 may also be coupled to a controller (not shown) within the connection module 106.

The parallel UPS system 100 operates by using a master/controlled UPS approach where one UPS is designated as the master UPS and the other UPS is designated as the controlled UPS. The master UPS is responsible for overall control of the power provided to the load 109 and any controlled UPS acts as a current source inverter and shares the load current as demanded by the master UPS. In one embodiment, either UPS can act as a master or controlled UPS, and the UPS's can dynamically change their designation as master or controlled if required; however, only one UPS may be designated as master at any given time.

Upon being connected to the connection module 106, the first UPS 102 and the second UPS 202 may begin to exchange information via the CAN bus 186, 188. Such information may include, but is not limited to:

Synchronization of UPS settings (output voltage, frequency and other user settings)
Firmware compatibility checkup among units in parallel
User view of system data
State diagram control of parallel system (to make sure units are in correct state and proper system operation is ensured).
Other less time critical data transfer In addition to the information exchanged via the CAN bus 186, 188, the UPS's 102, 202 also determine which UPS will operate as master and which will operate as controlled. However, because the operation of the parallel UPS system 100 depends on the master/controlled determination, the determination needs to be made relatively quickly. Utilization of the CAN bus 186, 188 to make such a determination jointly between UPS's may result in a delay in providing power to the load 109. As a result, at least some embodiments described herein utilize discrete analog and digital I/O signals for effective and timely individual master/controlled assignments.

Upon coupling the first UPS 102 to the connection module 106 via the first connector 105 and coupling the second UPS 202 to the connection module 106 via the second connector 107, each UPS 102, 202 utilizes the jumper sense signals received via the jumper sense Input/Output's (I/O's) (e.g., A sense 112, B sense 114, C sense 116, and D sense 118) to make an individual determination whether it is configured as a master or controlled UPS and to which connector 105, 107 the UPS is connected. Communications between the UPS's 102, 202 related to the master/controlled determination are not necessary as each UPS is capable of making an independent evaluation based on the jumper sense signals.

As shown in FIG. 1, each UPS 102, 202 is capable of monitoring four jumper sense signals via the jumper sense Input/Output's (I/O's) (e.g., A sense 112, B sense 114, C sense 116, and D sense 118). The configuration of the jumper sense signals determines whether a UPS will operate as a master or controlled UPS. According to one embodiment, the jumper sense signals are detected by the master/controlled detection circuit 110 (e.g., a DSP or Complex Programmable Logic Device (CPLD)) upon the UPS's being coupled to the connection module 106 and the parallel UPS system 100 powering up. Based on these sense signals, each UPS 102 202 will individually determine its own assigned configuration.

Figure 2A:
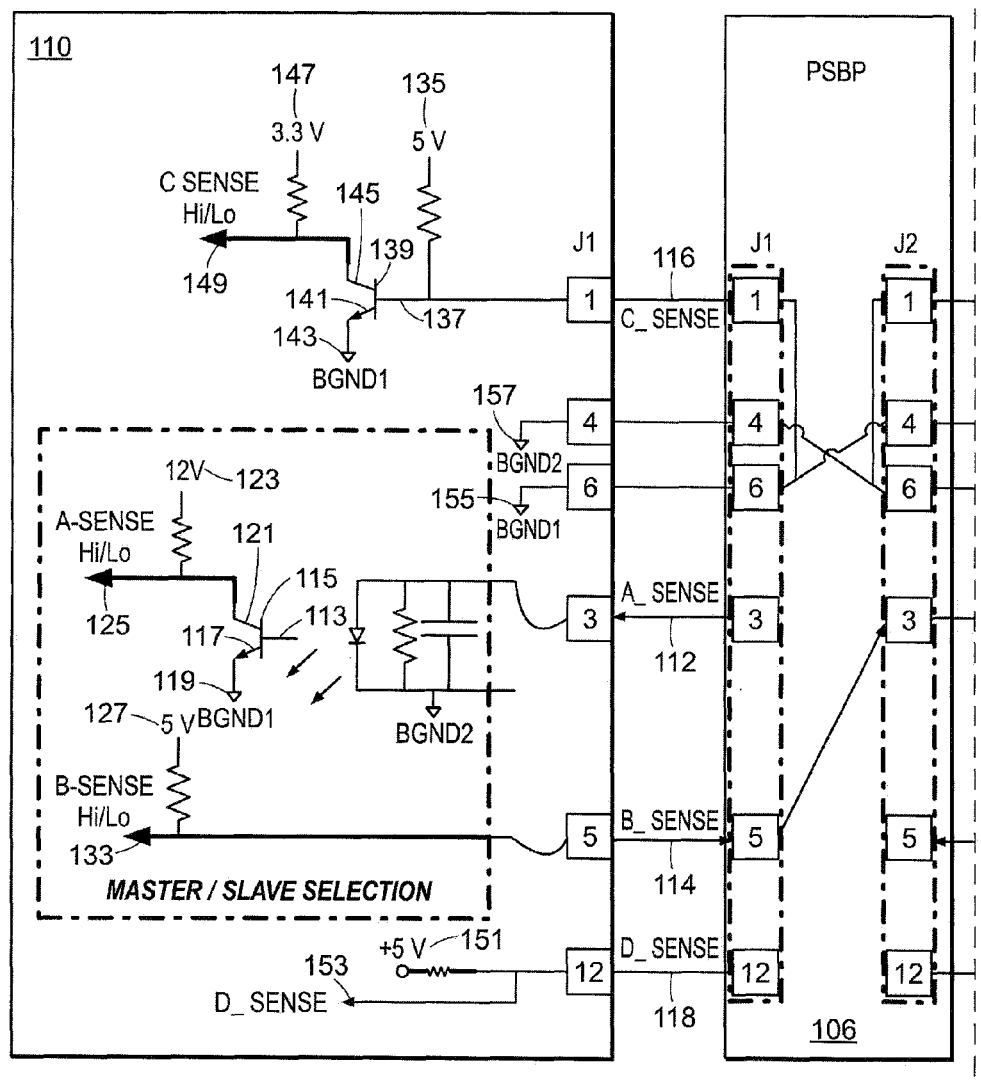
FIG. 2 is a circuit diagram of a master/controlled detection circuit in accordance with aspects of the present invention.
Figure 2B:
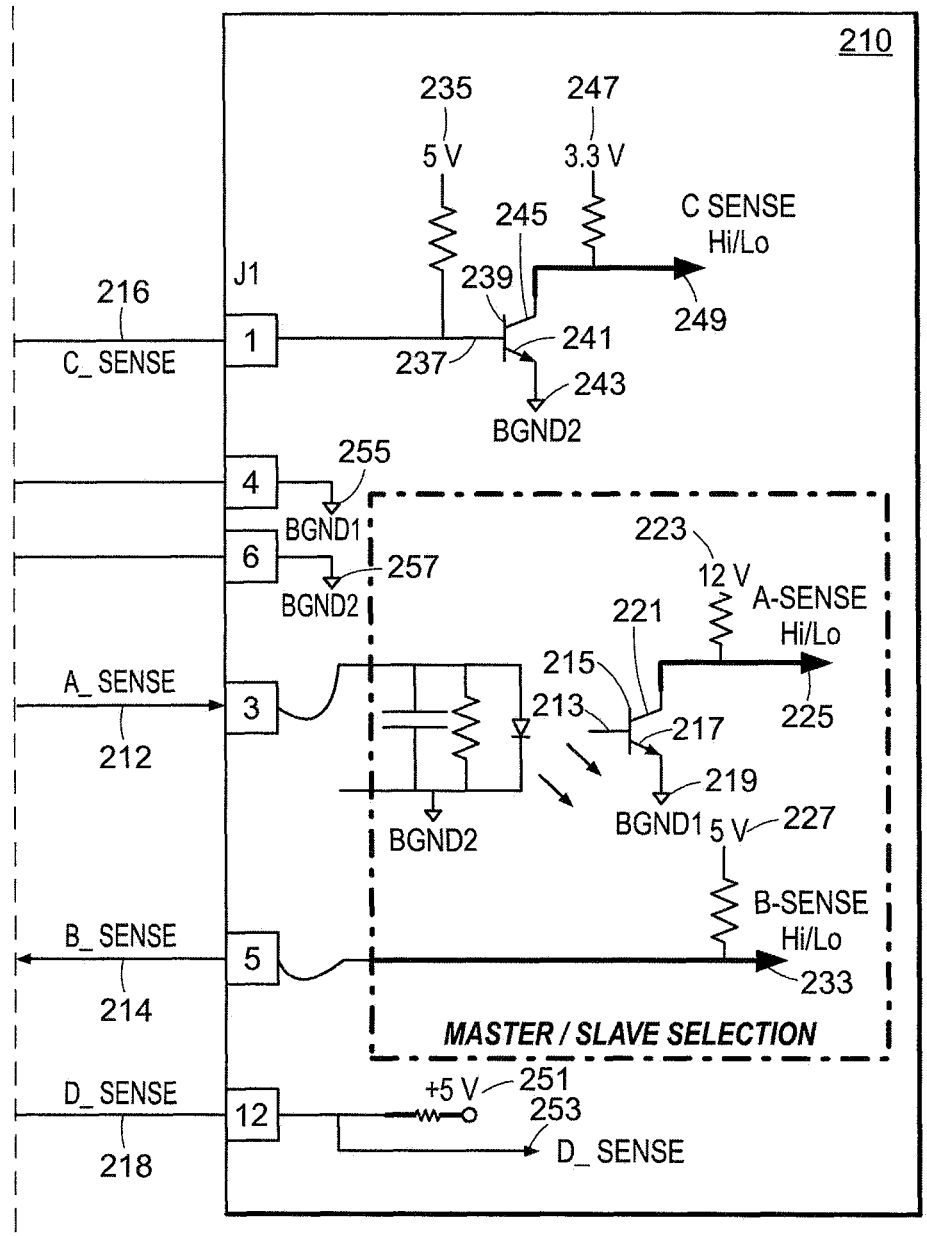

FIG. 2 is a circuit diagram of the master/controlled detection circuit 110, 210 in accordance with aspects of the present invention. The specific components of the master/controlled detection circuit 110 of the first UPS 102 will now be described in greater detail. The master/controlled detection circuit 110 of the first UPS 102 is substantially the same as the master/controlled detection circuit 210 of the second UPS 202 and like components are labeled using similar reference numbers, except that reference numbers for components of the master/controlled detection circuit 110 of the first UPS 102 start with the number one and reference numbers for components of the master/controlled detection circuit 210 of the second UPS 202 start with the number two.

The master/controlled detection circuit 110 includes an A sense I/O 112, a B sense I/O 114, a C sense I/O 116 and a D sense I/O 118. The A sense I/O 112 is coupled to the current reference select control circuit 120 and to a 12V DC source 123 via a switch 115. The B sense I/O 114 is coupled to the current reference select control circuit 120 and to a 5V DC source 127. The C sense I/O 116 is coupled to a 5V DC source 135. The C sense I/O 116 is also coupled to the current reference select control circuit 120 and to a 3.3V DC source 147 via a switch 139. The D sense I/O 118 is coupled to the current reference select control circuit 120 and to a 5V DC source 151.

For example, according to one embodiment, the A sense I/O 112 is coupled to the base 113 of a transistor 115. The emitter 117 of the transistor 115 is coupled to ground 119. The collector 121 of the transistor 115 is coupled to the 12V DC source 123 and to the current reference select control circuit 120. The B sense I/O 114 is coupled to the 5V DC source 127 and to the current reference select control circuit 12. Also, as described above, upon coupling the first UPS 102 to the connection module 106 and the second UPS 202 to the connection module 106, the B sense I/O 114 is coupled to the A sense I/O 212.

The C sense I/O 116 is coupled to the 5V DC source 135 and also to the base 137 of a transistor 139. The emitter 141 of the transistor 139 is coupled to ground 143. The collector 145 of transistor 139 is coupled to the 3.3V DC source 147 and to the current reference select control circuit 120. Also, upon coupling the first UPS 102 to the connection module 106 and the second UPS 202 to the connection module 106, the C sense I/O 116 is coupled to ground 155 and ground 255, and the C sense I/O 216 is coupled to ground 157 and ground 257. The D sense I/O 118 is coupled to the 5V DC source 151 and to the current reference select control circuit 120.

Table 1, shown below, illustrates different operational states or modes of the parallel UPS system 100 in relation to the master/controlled determination. As can be seen in FIG. 2 and Table 1, a high C sense signal 149, 249 indicates to the corresponding current reference select control circuit 120, 220 that a UPS is correctly coupled to the connection module 106. For example, if the first UPS 102 is correctly coupled to the connection module 106, the 3.3V DC source 147 will drive the C sense signal 149 high. If the first UPS 102 is not correctly coupled to the connection module 106, the 5V DC source 135 will turn on the transistor 139 and drive the C sense signal 149 low.

TABLE 1

| State | | A-Sense | B-Sense | C-Sense SBP Present | D-Sense | Mode of Operation | UPS AVAIL TX | UPS AVAIL RX | Master - M/ Controlled - C | S1 | S2 | S3 |
|---|---|---|---|---|---|---|---|---|---|---|---|---|
| | | | | At Power Up | | | | | | Open | Open | Open |
| 1-Stand Alone | 1A | 1 | 1 | 0 | nc | Stand Alone Par Cable missing | nc | nc | Std Alone (Main) | Close | Close | Open |
| | 1B | 1 | 1 | 1 | nc | SBP Conntected | nc | nc | | Close | Close | Open |
| 2-Fault/ Diag | 2A | 0 | 0 | 0 | 0 | Par Diag Mode | nc | nc | Diag-M | Close | Open | Close |
| | 2B | 0 | 0 | 0 | 1 | Fault | nc | nc | Fault | See Response table below | | |
| | 2C | 0 | 0 | 0 | 1 | Fault | nc | nc | (M) | | | |
| | 2D | 1 | 0 | 0 | nc | Fault | nc | nc | | | | |
| | 2E | 0 | 1 | 0 | nc | Fault | nc | nc | | | | |
| 3-Parallel Mode | 3A | 1 | 0 | 1 | nc | UPS1 (Master) | 0 (Bad) | 0 (Bad) | M | Open | Open | Open |
| | 3B | | | | nc | | | 1 (Good) | C | Open | Open | Close |
| | 3C | | | | nc | | 1 (Good) | nc | M | Close | Close | Open |
| | 3D | 0 | 1 | 1 | nc | UPS2 (Controlled) | 0 (Bad) | 0 (Bad) | M | Open | Open | Open |
| | 3E | | | | nc | | | 1 (Good) | C | Open | Open | Close |
| | 3F | | | | nc | | 1 (Good) | 0 (Bad) | M | Close | Close | Open |
| | 3G | | | | nc | | | 1 (Good) | C | Open | Open | Close |

As can be seen in FIG. 2 and Table 1, the A sense 125, 225 and B sense 133, 233 signals transmitted to the corresponding current reference select control circuit 120, 220 control the master/controlled UPS determination. When both the A sense signal 125, 225 and B sense signal 133, 233 are high, the connected UPS operates as the master UPS in stand alone mode. For example, upon coupling only the first UPS 102 to the connection module 106, the 12V DC source 123 drives the A sense signal 125 high and the 5V DC signal 127 drives the B sense signal 133 high, indicating to the current reference select control circuit 120 that the first UPS 102 will be operating in stand alone mode (i.e. state 1A or 1B as seen in Table 1).

Alternatively, upon powering up, the UPS system 100 will be configured in parallel mode with the first UPS 102 designated as master and the second UPS 202 designated as controlled if B sense signal 133 is low, A sense signal 125 is high, C sense signal 149 is high, A sense signal 225 is low, B sense signal 233 is high and C sense signal 249 is high. For example, upon coupling both the first UPS 102 and the second UPS 202 to the connection module 206, the 12V DC source 123 drives the A sense signal 125 high, the 5V DC signal 227 drives the B sense signal 233 high, the 3.3V DC source 147 drives the C sense signal 149 high and the 3.3V DC source 247 drives the C sense signal 249 high. The 5V DC source 127 turns on the transistor 215 consequently driving the B sense signal 133 and the A sense signal 225 low. As a result, the current reference select control circuit 120 recognizes that that first UPS 102 is designated as the master UPS (i.e. state 3A, 3B or 3C as seen in Table 1) and the current reference select control circuit 220 recognizes that the second UPS 202 is designated as the controlled UPS (i.e. state 3D-3G).

As seen in Table 1, other combinations of the A sense 125, 225, B sense 133, 233, and C sense 149, 249 signals may result in a fault condition. Also, according to one embodiment, the D sense signals 153, 253 may be utilized to indicate to the corresponding current reference select control circuit 120, 220 that the UPS system 100 should enter a diagnostic mode. For example, in one embodiment, when D sense 153, 253, A sense 125, 225, B sense 133, 233, and C sense 149, 249 signals are all low, the UPS system 100 will enter a diagnostic mode. The D sense signals 153, 253 in relation to the diagnostic mode will be discussed in greater detail below.

As seen in Table 1, additional signals may also impact the operational status of each of the UPS's coupled in parallel with the UPS system 100. Referring to FIG. 1, in addition to jumper sense signals, each current reference select control circuit 120, 220 also receives signals indicating the health of its own UPS and of the other UPS. For example, each UPS generates a UPS_AVAIL_TX signal, indicating if the UPS is able to supply a load, and provides the signal to the corresponding UPS available transmit I/O 150, 250. The UPS_AVAIL_TX signal is generated by a UPS's corresponding UPS available detection circuit 152, 252. The UPS available detection circuit 152, 252 monitors a variety of UPS faults 154, 254. If any one of the UPS faults indicates a problem with the UPS, the UPS_AVAIL_TX signal will be driven low, indicating that there is a problem with the UPS. Otherwise, if no problems are detected, the UPS_AVAIL_TX signal is driven high, indicating that there are no health issues with the UPS.

According to one embodiment, the UPS available detection circuit 152, 154 monitors UPS faults such as:
PRIM_CHK: Fault with error amplifier
INTERNAL_FLT_DSP: This signal is generated by the DSP based on numerous surveillance faults that the DSP monitors and detects.
DC_BUS_OV: DC bus voltage faults. In the event of this fault, the PFC and Inverter need to be disabled immediately and open the inverter relay.
INV_FLT: Inverter hardware fault. The inverter will be disabled and the inverter relay is opened immediately
INV_OV: Inverter over voltage fault. The inverter will be disabled and the inverter relay is opened immediately
IGBT_FAULT: PFC and/or Inverter IGBT fault. In the event of this fault, the PFC and Inverter need to be disabled immediately and open the inverter relay.

In other embodiments, other UPS faults may be monitored and any number of defined combinations may trigger UPS_AVAIL_TX to go low. In addition, each UPS also receives a UPS_AVAIL_RX signal from the other UPS, via the UPS available receive I/O 148, 248, indicating whether the other UPS is able to supply a load. As shown in Table 1, in addition to the jumper sense signals, the health of the UPS's may impact the mode of operation of the parallel UPS system 100.

According to one embodiment and as shown in FIG. 1, both UPS's share a common current reference signal called PRIM_BUS and each UPS utilizes two differential control analog signals, PRIM_BUS_TX and PRIM_BUS_RX to provide or receive the PRIM_BUS signal. The PRIM_BUS_TX and PRIM_BUS_RX differential control analog signals are transmitted or received via the corresponding primary bus transmit and receive I/O's 128, 142, 228, 242 within each UPS. The primary bus transmit I/O of one UPS 128, 228 is connected to the primary bus receive I/O 142, 242 of the other UPS. The UPS that uses the PRIM_BUS_TX signal for inverter control is considered the master UPS, while the UPS that uses PRIM_BUS_RX for inverter control is considered the controlled UPS. The selection of either PRIM_BUS_TX or PRIM_BUS_RX by a UPS as the appropriate control signal depends on the health (i.e. the status of UPS_AVAIL_TX and UPS_AVAIL_RX signals) and state (i.e. the state of the jumper sense signals) of each UPS.

As described previously, each UPS 102, 202 has its own Vea 124, 224, Cea 130, 230, and single pole analog switch bank 122. Each Vea 124, 224 receives an inverter voltage sense signal via the inverter voltage sense line 164, 264 from the inverter 163, 263. Each Vea also receives a reference voltage signal 166, 266 from the DSP 170, 270 via the DC blocking and filter circuit 168, 268. Each Vea 124, 224 compares the inverter voltage sense signal with the voltage reference signal and generates a voltage error signal at the output 126, 226 of the Vea 124, 224. The output 126, 226 of the Vea 124 can be coupled to the primary bus transmit I/O 128, 228 through switch SW1 122a, 222a and the voltage error signal can be provided to the primary bus transmit I/O 128, 228 as the PRIM_BUS_TX signal. The signal input to the Cea 130, 230 (i.e. the current reference signal 189, 289) is taken either from the PRIM_BUS_TX signal via switch SW2 122b, 222b or from the PRIM_BUS_RX signal via the output 134 of the amplifier 136 and switch SW3 122c, 222c.

In addition to the current reference signal 189, 289, each Cea 130, 230 also receives a DC bus balance signal from the DSP 170, 270 via the filter and buffer circuit 180, 280 and an inverter current sense signal from the inverter 163, 263 via an inverter current sense line 176, 276. Based on a comparison of the current reference signal and the inverter current sense signal, the Cea 130, 230 provides a current error signal to the inverter controller 182, 282 via the output 181, 281 of the Cea 130, 230.

According to one embodiment, AC power supplied by the external power source to the input 101 is converted to DC power (e.g., via a Power Factor Correction circuit (not shown)) and supplied to the ±DC bus 199. Based on the current error signal, the inverter controller 182, 282 sends control signals to the inverter 163, 263 to convert the DC power back into regulated AC power. As a result, the inverter 163, 263 provides properly regulated AC power to the load 109 from the output 184, 284 of the inverter 163, 263.

In another embodiment, where appropriate power from the external power source is not available at the first input 101, the inverter 163, 263 receives DC power from a battery (not shown) coupled to the ±DC bus 199. Based on the current error signal, the inverter controller 182, 282 sends control signals to the inverter 163, 263 to convert the DC power from the battery into regulated AC power. As a result, the inverter 163, 262 provides properly regulated AC power to the load 109 from the output 184, 284 of the inverter 163, 263.

The operation of the switch bank 122, 222 (and hence the operational mode of each UPS and operation of the parallel UPS system 100) depends on the configuration of each UPS (i.e. the health and jumper status of each UPS in the parallel UPS system 100). For example, as seen in Table 1 at state 1A and 1B, when the first UPS 102 is defined as the master UPS (i.e. due to the jumper sense signals signifying that the UPS 102 should operate in stand alone mode), switches SW1 122*a* and SW2 122*b* are closed and switch SW3 122*c* is open. In this configuration, the voltage reference signal at the output 126 of the Vea 124 is provided to the primary bus transmit I/O 128 as the PRIM_BUS_TX signal via switch SW1 122*a*. The PRIM_BUS_TX signal is provided to the Cea 130 as the current reference signal via switch SW2 122*b*.

In another example, as seen in Table 1, at states 3A and 3D, when the first UPS 102 is defined as the master UPS and the second UPS 202 is defined as the controlled UPS (i.e. due to the jumper sense signals), the UPS_AVAIL_TX of the first UPS 102 is low (indicating the health of the first UPS 102 is bad and consequently that UPS_AVAIL_RX received by the second UPS 202 from the first UPS 102 is also low), and the UPS_AVAIL_RX signal received by the first UPS 102 from the second UPS 202 is low (indicating the health of the second UPS is also bad and consequently that UPS_AVAIL_TX of the second UPS 202 is also low), all three switches are opened as both UPS's have failed. Once all three switches are opened, the parallel UPS system 100 goes into bypass mode and the inverters 163, 263 are disabled. Bypass mode will be discussed in greater detail below.

In an additional example, as seen in Table 1 at states 3B and 3F, when the first UPS 102 is defined as the master UPS and the second UPS 202 is defined as the controlled UPS (i.e. due to the jumper sense signals), the UPS_AVAIL_TX of the first UPS 102 is low (indicating the health of the first UPS 102 is bad and consequently that UPS_AVAIL_RX received by the second UPS 202 from the first UPS 102 is also low), and the UPS_AVAIL_RX signal received by the first UPS 102 from the second UPS 202 is high (indicating the health of the second UPS is good and consequently that UPS_AVAIL_TX of the second UPS 202 is also high), the first UPS 102 is reconfigured as the controlled UPS (because it has failed) and the second UPS 202 is reconfigured as the master UPS. As a result, switches SW1 122*a*, SW2 122*b*, and SW3 222*c* are opened while switches SW3 122*c*, SW1 222*a*, and SW2 222*b* are closed. In this configuration, the voltage reference signal at the output 226 of the Vea 224 is provided to the primary bus transmit I/O 228 as the PRIM_BUS_TX signal via switch SW1 222*a*. The PRIM_BUS_TX signal is provided to the Cea 230 as the current reference signal via switch SW2 222*b*. The PRIM_BUS_TX signal is also provided to the primary bus receive I/O 142 as the PRIM_BUS_RX signal. The PRIM_BUS_RX signal is provided, as the current reference signal, to the Cea 130, via the amplifier 136 and switch SW3 122*c*.

In another example, as seen in Table 1 at states 3C, 3E and 3G, when the first UPS 102 is defined as the master UPS and the second UPS 202 is defined as the controlled UPS (i.e. due to the jumper sense signals) and the UPS_AVAIL_TX of the first UPS 102 is high (indicating the health of the first UPS 102 is good and consequently that UPS_AVAIL_RX received by the second UPS 202 from the first UPS 102 is also high), the first UPS 102 maintains its configuration as the master UPS and the second UPS 202 maintains its configuration as the controlled UPS, regardless of the health status of the second UPS 202. In such a configuration, switches SW1 122*a*, SW2 122*b*, and SW3 222*c* are closed and switches SW3 122*c*, SW1 222*a*, and SW2 222*b* are open. The voltage reference signal at the output 126 of the Vea 124 is provided to the primary bus transmit I/O 128 as the PRIM_BUS_TX signal via switch SW1 122*a*. The PRIM_BUS_TX signal is provided to the Cea 130 as the current reference signal via switch SW2 122 *b*. The PRIM_BUS_TX signal is also provided to the primary bus receive I/O 242 as the PRIM_BUS_RX signal. The PRIM_BUS_RX signal is provided, as the current reference signal, to the Cea 230, via the amplifier 236 and switch SW3 222*c*.

As shown in Table 2 below, operational states of the parallel UPS system 100 may change during operation. For example, if upon powering up the UPS system 100, a load is not currently coupled to the connection module 106, the parallel UPS system will enter a stand-by mode. Once a load is coupled to the system, the system 100 will enter the appropriate state according to the current configuration of the jumper sense signals. Also, if while in standby mode, a fault occurs, a "Configuration Fault" may be displayed to the user via a user interface (not shown) and the UPS system 100 will be prevented from turning on until the fault is corrected.

TABLE 2

| | Description - Par Jumper State | Response |
|---|---|---|
| 1 | Valid Cofiguration (latched when load is turned On) | In Stand By mode - respond to Par jumper snese and changes, Latch state when output is turned On<br>In On Mode consider following State Change:<br>1A --> 1B: Stay in Original state and display "Config Change Message" and ask for confirmation to change state<br>1B --> 1A: Stay in Original State and display "Config Change" and ask to chk the par cable<br>1 --> 3: Goto Bypass, display "Config Change" and ask for confirm to resume parallel Op<br>3 --> 1: Goto Bypass, display "Config Change" and ask to chk Par cable and resume parallel Op once the Config is back to Par Mode |
| 2 | Illegal State | In Stand By mode - display "Config Fault", don't allow unit to turn-On but respond to Par jumper snese and changes<br>In On Mode:<br>X --> 2: Goto Bypass, display "Config Change" and ask to chk Par cable and resume a legal state once the Config is back to State 1 or 3<br>In Par Diag Mode: Recongnized in Stand-by mode only<br>State 2A: Diagnostic Self Test to isolate a UPS with Prim_Bus_T/Rx Faults and chk all Par Connector signals - Special Par. Conn will be used. |

If while in state 1A (i.e. the UPS is currently uncoupled from the connection module 106 and in stand alone mode) the UPS is coupled to the connection module 106, the UPS will remain in state 1A and ask the user for confirmation that the change to state 1B is desired. If while in state 1B (i.e. the UPS is currently coupled to the connection module 106 and in stand alone mode) the UPS becomes disconnected from the connection module 106, the UPS will notify the user of the connection problem and ask the user to check the connection.

If the UPS is in either state 1A or 1B and a switch to parallel operation is sensed (i.e. any of states 3A-3G), the parallel UPS system 100 will enter bypass mode until a user confirms the desire to begin parallel operation. If the parallel UPS system 100 is currently operating in parallel operation and a switch to either state 1A or 1B is sensed, the parallel UPS system 100 will enter bypass mode, ask the user to check the UPS connections to the connection module 106, and resume parallel operation once parallel operation can be resumed.

If the UPS is operating in any on-mode (i.e. stand alone operation or parallel mode operation) and the parallel UPS system 100 enters a fault state (i.e. state 2B-2E), the parallel UPS system 100 will enter bypass mode, ask the user to check the UPS connections to the connection module 106, and resume a legal state once the configuration is back to stand alone or parallel operation.

As discussed above, in response to certain operational states of the parallel UPS system 100, the first UPS 102 and the second UPS 202 may desire to enter a bypass mode. Operation of a bypass mode within the parallel UPS system 100 is controlled by the bypass control circuit 160, 260 in each of the UPS's 102, 202. As mentioned previously, as both UPS's 102, 202 are providing power to the load 109 via the same output 108 of the connection module 106, the power provided by both UPS's must be carefully managed by the master UPS. Therefore, configuring when a UPS is allowed to enter bypass mode and provide unregulated power to the load 109 must also be carefully managed. As such, according to one embodiment, the parallel UPS system 100 is capable of operating in a variety of modes.

In a first mode of operation, the bypass control circuit 160, 260 of the master UPS controls the parallel UPS system 100, so that only one UPS is feeding the load 109, either from the inverter output 184, 284 or via bypass, at a time. The other UPS does not provide power to the load 109.

In a second mode of operation, the master UPS controls the parallel UPS system 100 so that half of the power provided to the load 109 is regulated power generated by the master UPS and half of the power provided to the load 109 is regulated power generated by the controlled UPS.

In a third mode of operation, the bypass control circuit 160, 260 of the master UPS controls the parallel UPS system 100 so that half of the power provided to the load 109 is unregulated power from the master UPS in bypass mode and half of the power provided to the load 109 is unregulated power from the controlled UPS in bypass mode.

According to one embodiment, the bypass control circuit 160, 260 of the master UPS determines when a UPS of the parallel UPS system 100 enters bypass mode by following two redundancy objectives. The first redundancy objective is that upon component failure (i.e. UPS_AVAIL_TX/RX indicating a failed UPS); each UPS should change their mode so that their combined power output to the load 109 is maintained. The second redundancy objective is that each UPS should select their bypass mode in such a way that their combined state minimizes component stress (e.g., battery, power electronics, etc.) to extend the life of the system 100.

Also, according to one embodiment, the bypass control circuit 160, 260 prevents the parallel UPS system 100 from providing a portion of regulated power from one UPS and a portion of unregulated power from the other UPS to the load 109. To avoid such a situation, bypass switches of paralleled UPS's are controlled in unison by the single master UPS.

In one embodiment, a user can request the bypass operation from the controlled UPS's interface. The controlled UPS, in turn, sends a request to the master UPS, requesting entry into bypass mode. This bypass control handshake is done by exchanging the digital signal BYP_CNTL_TX as depicted in FIG. 3.

Figure 3:
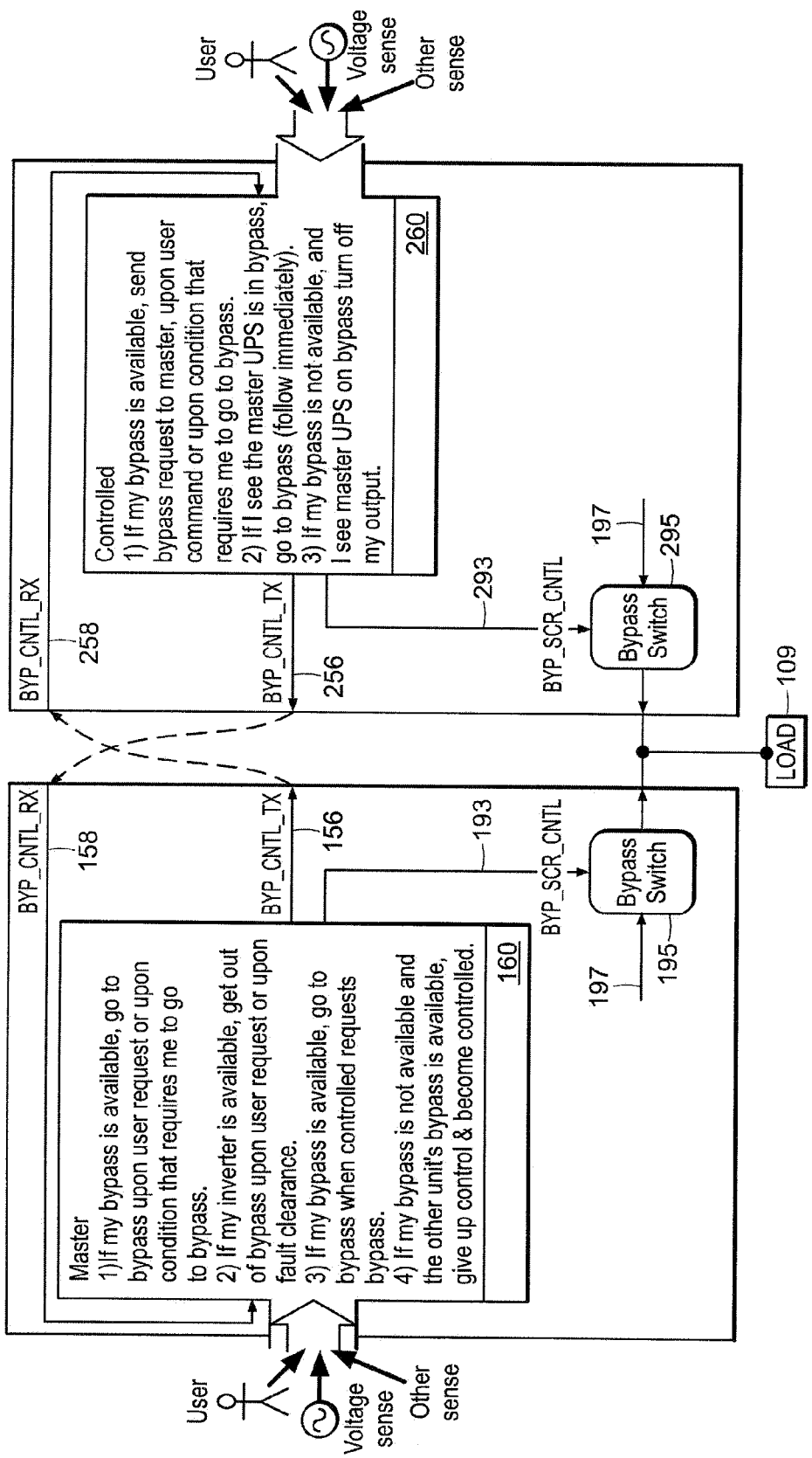
FIG. 3 is a schematic diagram of a bypass control logic circuit in accordance with aspects of the present invention.

FIG. 3 is a schematic diagram of a bypass control logic circuit 160, 260 in accordance with aspects of the present invention. As seen in FIG. 1, each bypass control logic circuit 160, 260 is coupled to the DSP 170, 270. Each bypass control logic circuit 160, 260 is also coupled to the bypass control transmit I/O 156, 256, to the bypass control receive I/O 158, 258, and to a bypass switch control line 193, 293. Each bypass switch control line 193, 293 is coupled to a bypass switch 195, 295 and each bypass switch 195, 295 is coupled between the load 109 and the external bypass power source coupled to the second input 197. Upon coupling the first UPS 102 and the second UPS 202 to the connection module, the bypass control transmit I/O 156 is coupled to the bypass control receive I/O 258 via the connection module 106 (not shown) and the bypass control receive I/O 158 is coupled to the bypass control receive I/O 256 via the connection module 106 (not shown).

If the parallel UPS system 100 is to enter bypass mode, the bypass control logic circuit 160, 260 sends bypass switch control signals to the bypass switch 195, 295 via the bypass switch control line 193, 293 to operate the bypass switch 195, 295 to couple the load 109 directly to the external bypass power source coupled to the second input 197, providing unregulated power directly to the load 109.

As seen in FIG. 1, each UPS's bypass control circuit 160, 260 receives reference information 191, 291 from the DSP 170, 270. According to one embodiment, the reference information 191, 292 includes information regarding the condition of the corresponding UPS. For example, such condition information may include information regarding synchronization with a corresponding inverter, bypass voltage health, UPS health, a user interface communication/request, information regarding a current state or state change request, or any other information related to whether the corresponding UPS should enter bypass mode. Based on the received conditions, the bypass control circuit 160, 260 determines whether a UPS should enter bypass mode.

According to one embodiment, if the bypass control circuit 160 of a master UPS 102 determines that the UPS 102 should enter bypass mode (e.g., in response to a user request or a condition that requires the UPS to go to bypass), the bypass control circuit 160 confirms that bypass is available, informs the bypass control circuit 260 of the controlled UPS 202 that the master UPS 102 is going into bypass (via a high BYP_CNTL_TX signal on the bypass control transmit I/O 156 and consequently a high BYP_CNTL_RX signal on the bypass control receive I/O 258), and activates the bypass switch 195 of the UPS 102 to enter bypass mode and provide unregulated power to the load 109.

If, upon entering bypass mode, the bypass control circuit 160 of the master UPS 102 determines that the UPS's inverter 163 is available to provide appropriate regulated power, the bypass control circuit 160 of the master UPS 102 will control the master UPS 102 to exit bypass mode and inform the bypass control circuit 260 of the controlled UPS 102 that the master UPS 102 is no longer in bypass mode (via a low BYP_CNTL_TX signal on the bypass control transmit I/O 156 and consequently a low BYP_CNTL_RX signal on the bypass control receive I/O 258).

If the bypass control circuit 160 of the master UPS 102 receives a bypass request from the controlled UPS 202 (i.e. in the form of a high BYP_CNTL_TX signal on the bypass control transmit I/O 256 and consequently a high BYP_CNTL_RX signal on the bypass control receive I/O 158), as long as bypass is available at the time of the request, the bypass control circuit 160 will put the master UPS 102 into bypass mode. However, if at the time of the bypass request by the controlled UPS 202, bypass is not available in the master UPS 102, the master UPS 102 and the controlled UPS 202 will switch master/controlled designations and the new controlled UPS 102 will cede control of the two parallel UPS's to the new master UPS 202.

According to another embodiment, if a bypass control circuit 260 of a controlled UPS desires to enter bypass mode (e.g., in response to a user command or condition that requires the UPS to do so); as long as bypass is available to the controlled UPS 202, the bypass control circuit 260 will send a bypass request to the master UPS 102 (i.e., in the form of a high BYP_CNTL_TX signal on the bypass control transmit I/O 256 and consequently a high BYP_CNTL_RX signal on the bypass control receive I/O 158). As discussed above, upon receiving a request from the controlled UPS 202, as long as bypass is available, the bypass control circuit 160 of the master UPS 102 will drive the master UPS 102 into bypass mode. Upon seeing the master UPS 102 enter bypass mode (i.e. the high BYP_CNTL_TX signal on the bypass control transmit I/O 156 and consequently a high BYP_CNTL_RX signal on the bypass control receive I/O 258), the bypass control circuit 260 will immediately drive the controlled UPS 202 into bypass mode to follow the master UPS 102.

In one embodiment, if bypass in the controlled UPS 202 is not available, but the bypass control circuit 260 sees that the master controller 160 has entered bypass mode (i.e. the high BYP_CNTL_TX signal on the bypass control transmit I/O 156 and consequently a high BYP_CNTL_RX signal on the bypass control receive I/O 258), the controlled UPS 202 will deactivate as the controlled UPS 202 cannot provide regulated power to the load 109 while the master UPS 102 is providing unregulated power. According to one embodiment, if bypass is not available on at least one of the UPS's, the parallel UPS system 100 may ignore bypass requests.

As mentioned above, the parallel UPS system 100 may enter a diagnostic mode if all of the jumper senses (A-D) are low. According to one embodiment, the diagnostic mode can only be entered from standby mode and the diagnostic mode is a self test mode used to isolate a UPS with PRIM_BUS_TX/RX faults and to check all connection module signals.

As described above in relation to Table 1, upon detection of a fault in any one of the paralleled UPS's, the faulty UPS will be selectively isolated while power is still provided from the power output of the parallel UPS system 100. In some cases, system faults may be detected in a parallel UPS system, with the faults occurring in a manner such that it is difficult to isolate the faults to one UPS. For example, when faults occur with circuit portions of a UPS that are shared or connected to other paralleled UPS's via signal wires, it may be difficult to isolate the faults in either parallel or stand-alone modes. When such a fault occurs in the field, it may be necessary in prior systems to send both UPS's in a system in for repair, when only one of the UPS's is in fact faulty. For example, in reference to the parallel UPS system 100 of FIG. 1, if a fault exists somewhere within one of the primary bus transmit I/O's 128, 228 or within one of the primary bus receive I/O's 142, 242, because the transmit and receive I/O's are coupled together directly via the connection module 106, it may not be possible for the parallel UPS system 100 to determine which UPS is the source of the fault.

At least some embodiments described herein provide a system and method for identifying a faulty UPS in a system wherein the faults occur within shared circuit portions between paralleled UPS's.

Figure 4B:
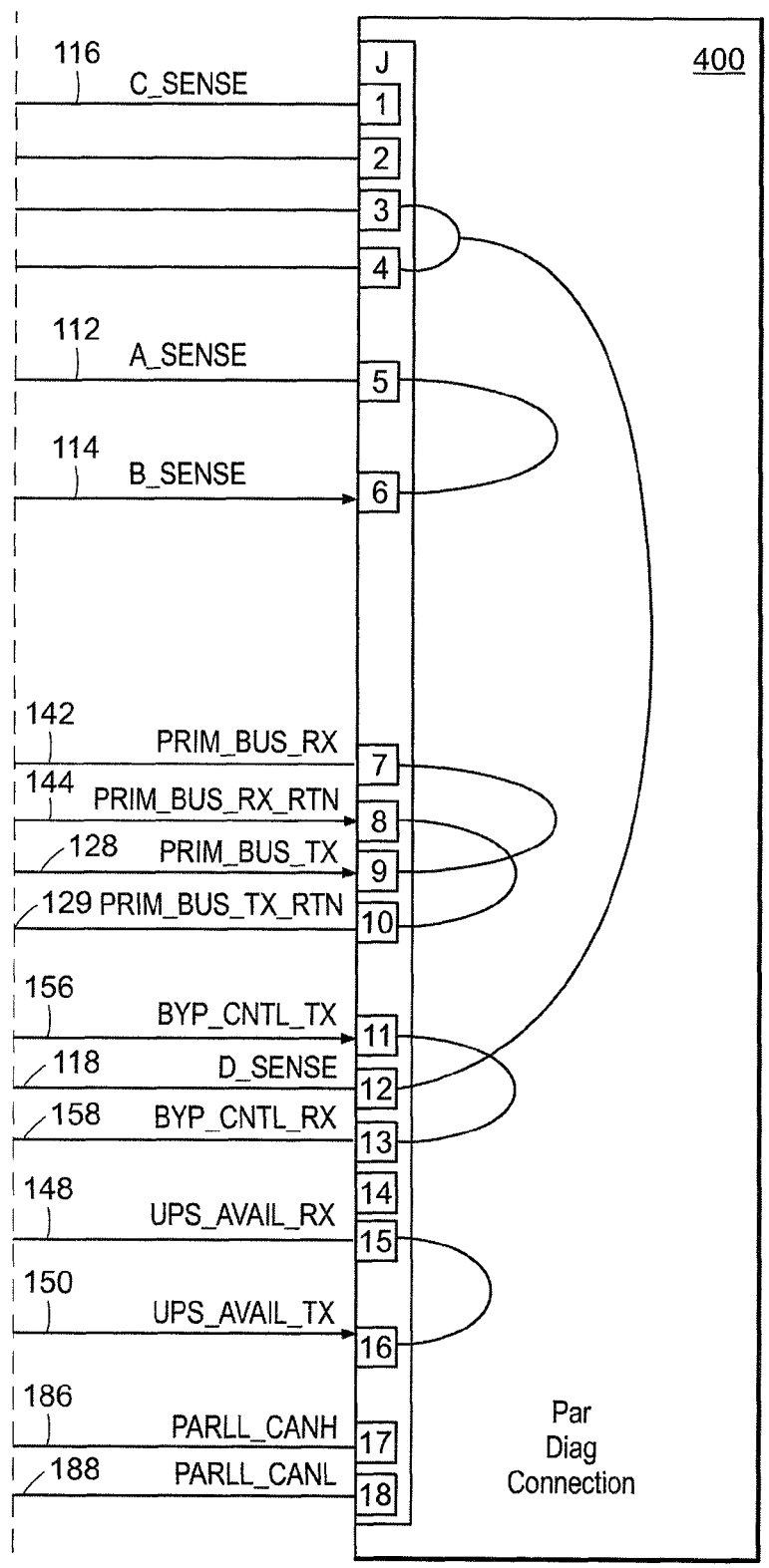
FIG. 4 is a circuit diagram of a UPS in diagnostic mode with parallel diagnostic connection in accordance with aspects of the present invention.

FIG. 4 is a circuit diagram of the first UPS 102 (as described in relation to FIGS. 1, 2 and 3) configured in a diagnostic mode with parallel diagnostic connector 400 in accordance with aspects of the present invention. When a user of a parallel UPS system 100 wishes to individually test the operation of a single UPS (e.g., the first UPS 102), the first UPS 102 is disconnected from other UPS's and key control and status signals are wrapped around back towards the first UPS 102 as shown in FIG. 4 by a test connector 400 (e.g., a parallel diagnostic connection). According to one embodiment, the first UPS 102 may be disconnected manually from the connection module 106 (and as a result from a second UPS 202) and instead, manually connected to the test connector 400 by a user. According to one embodiment, if a user wishes to test both UPS's individually, the second UPS 202 is also disconnected manually from the connection module 106 and instead, manually connected to a second test connector by the user.

According to another embodiment, the test connector 400 is located within the connection module 106, and the connection module 106 includes relays that are configured, upon activation of the self diagnostic mode in the first UPS 102, to automatically disconnect the first UPS 102 from the connection module 106 (and consequently the second UPS 202) and instead couple the first UPS 102 to the test connector 400 to wrap the key control and status signals around back towards the first UPS 102 as shown in FIG. 4. According to one embodiment, upon completion of operational testing of the first UPS 102 and upon activation of the self diagnostic mode in the second UPS 202, the relays of the connection module 106 disconnect the first UPS 102 from the connection module 106 and instead couple the second UPS 202 to the test connector 400 to wrap the key control and status signals back towards the second UPS 202 similarly as shown in FIG. 4.

According to one embodiment, when the first UPS 102 is in standby mode, if the first UPS 102 is disconnected from the connection module 106 and is instead coupled to the test connector 400, the D sense I/O 118 is coupled to ground 155 and ground 157, driving the D sense signal 153 low. In addition, upon the first UPS 102 being coupled to the test connector 400, the A sense I/O 112 is coupled to the B sense I/O, causing the 5V DC source 127 to turn on the transistor 115, resulting in the A sense signal 125 and B signal 133 being driven low. Also, because the first UPS 102 is not connected to the connection module 106, the C sense signal 149 is also driven low.

In addition, once the first UPS 102 is coupled to the test connector 400, the primary bus receive I/O 142 is coupled to the primary bus transmit I/O 128, the primary bus receive return I/O 144 is coupled to the primary bus transmit return I/O 129, the bypass control transmit I/O 156 is coupled to the bypass control receive I/O 158, and the UPS available receive I/O 148 is coupled to the UPS available transmit I/O. In this way, signals provided to any of the I/O's by the first UPS 102 will also be received by I/O's of the first UPS 102.

As shown in Table 1, all four of the sense signals (A, B, C and D) being low indicates to the current reference select control circuit 120 that the first UPS 102 is in a self diagnostic mode. Also as seen in Table 1, in response to the self diagnostic mode of first UPS 102, switches SW1 122a and SW3 122c are closed and switch SW2 122b is open. In this configuration, the voltage reference signal at the output 126 of the Vea 124 is provided to the primary bus transmit I/O 128 as the PRIM_BUS_TX signal via switch SW1 122a. The PRIM_BUS_TX signal is also received by the primary bus receive I/O 142 as the PRIM_BUS_RX signal and provided to the Cea 130 as the current reference signal via switch SW3 122c.

After the first UPS 102 recognizes that it is in self diagnostic mode, it performs an inverter self test to make sure that all of the components of the UPS 102 are working appropriately. If there is a fault, (e.g., an issue with a common parallel circuit portion such as primary bus transmit I/O 128 or primary bus receive I/O 142), then the first UPS is identified as having a fault. According to one embodiment, while in self diagnostic mode, the operational status of the bypass control I/O's (bypass control transmit I/O 156 and bypass control receive I/O 158) and the UPS available I/O's (UPS available transmit I/O 150 and UPS available receive I/O 148) is also confirmed. Also, in another embodiment, the bypass switch 195 (seen in FIG. 3) will be prohibited from turning on as long as the test connector 400 is coupled to the UPS 102.

Even though examples in accordance with the present invention are described herein with reference to the use of one or two UPS's 102, 202 in a parallel UPS system 100, other examples may utilize more than two UPS's coupled together in parallel Even though examples in accordance with the present invention are described herein in reference to Uninterruptible Power Supplies (UPS), other examples may be utilized with any type of parallel power system in which dual power sources are desired to be coupled together and controlled effectively and efficiently. It also is to be appreciated that examples in accordance with the present invention may be utilized to monitor any type (e.g., commercial or residential) or size system.

By providing a parallel UPS system in which a first UPS and second UPS, coupled in parallel, are capable of providing power to a load using a master/controlled approach and independently determining their appropriate master/controlled determination, absent the exchange of initial master/controlled configuration information between the UPS's, the parallel UPS system is able to more efficiently provide power to a load without unwanted delay. In addition, based on master/controlled jumper signals, UPS availability signals and bypass control signals, the parallel UPS system is capable of providing additional functionality as described above.

Also, by providing a system and method for the determination of faulty UPS's based on faults identified within shared circuit portions between paralleled UPS's, a parallel UPS system is able to isolate a UPS having a fault in a circuit portion in common or shared with other paralleled UPS's.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of operating a UPS system having a first UPS, the method comprising:
    powering on the first UPS;
    detecting a first signal at a first I/O of the first UPS using a first detection circuit of the first UPS;
    detecting a second signal at a second I/O of the first UPS using a second detection circuit of the first UPS;
    based on a status of the first signal and a status of the second signal, configuring the first UPS to operate in one of a master mode of operation and a controlled mode of operation.

2. The method of claim 1, further comprising:
    operating the first UPS in the master mode of operation;
    in the master mode of operation generating in the first UPS an output control signal and providing the output control signal at a third I/O of the first UPS; and
    controlling operation of an output inverter of the first UPS using the output control signal.

3. The method of claim 2, further comprising:
    operating the first UPS in the controlled mode of operation;
    in the controlled mode of operation, receiving an input control signal at a fourth I/O of the first UPS; and
    controlling operation of the output inverter of the first UPS using the input control signal.

4. The method of claim 3, wherein the UPS system further includes a second UPS coupled in a parallel configuration with the first UPS, and wherein the method further includes:
    powering on the second UPS;
    detecting a third signal at a first I/O of the second UPS using a first detection circuit of the second UPS;
    detecting a fourth signal at a second I/O of the second UPS using a second detection circuit of the second UPS;
    based on a status of the third signal and a status of the fourth signal, configuring the second UPS to operate in one of a master mode of operation and a controlled mode of operation.

5. The method of claim 4, further comprising:
    configuring the first, second, third and fourth signals, such that at any given time only one of the first UPS and the second UPS is configured in the master mode of operation and only one of the first UPS and the second UPS is configured in the controlled mode of operation.

6. The method of claim 5, further comprising:
    coupling the second I/O of the first UPS to the first I/O of the second UPS; and
    controlling operation of an output inverter of the second UPS using a control signal generated by the first UPS.

7. The method of claim 1, further comprising detecting a fifth signal at a fifth I/O of the first UPS, and configuring the first UPS to operate in a stand-alone mode of operation.

8. A UPS comprising:
    a first input to receive input power from a first power source;
    a second input to receive input power from a second power source;
    an output coupled to provide output power;
    output power circuitry coupled to the output and configured to provide the output power derived from at least one of the first power source and the second power source;
    a first I/O;
    a second I/O; and
    control circuitry coupled to the first I/O and the second I/O and configured to control the UPS to operate in one of a master mode of operation and a controlled mode of operation based on first and second control signals at the first I/O and the second I/O;
    wherein the control circuitry in the master mode of operation is configured to generate a control signal to control the output power circuitry, and in the controlled mode of operation is configured to receive a control signal from an external device to control the output power circuitry.

9. The UPS of claim 8 further comprising:
    a third I/O coupled to the control circuitry and configured to receive a third control signal; and
    wherein the control circuitry is further configured to operate the UPS in one of a stand-alone mode and a parallel mode based on a status of the third control signal.

10. The UPS of claim 9, further comprising:
    a bypass switch coupled to the first input, the output and the control circuitry and operable under control of the control circuitry to selectively couple the first input to the output to provide in a bypass mode of operation the input power from the first power source at the output bypassing the output power circuitry.

11. The UPS of claim 10, further comprising a fourth I/O coupled to the control circuitry and configured to receive a fourth control signal, and wherein the control circuitry is further configured to inhibit bypass mode of operation based on a status of the fourth control signal.

12. The UPS of claim 10 further comprising:
a fifth I/O coupled to the control circuitry and configured to receive a status signal from a parallel connected UPS, and wherein the control circuitry is configured to change an operational mode of the UPS from controlled mode of operation to master mode of operation based on a state of the status signal.

13. A UPS system comprising:
a first UPS and a second UPS, each of the first UPS and the second UPS including:
a first input to receive input power from a first power source;
a battery configured to provide battery power;
an output coupled to provide output power;
output power circuitry coupled to the output and configured to provide the output power derived from at least one of the first power source and the battery;
a first I/O;
a second I/O; and
control circuitry coupled to the first I/O and the second I/O and configured to set a mode of operation as one of a master mode of operation and a controlled mode of operation based on first and second control signals at the first I/O and the second I/O,
wherein the control circuitry in the master mode of operation is configured to generate an output control signal to control the output power circuitry, and in the controlled mode of operation is configured to receive an input control signal from an external device to control the output power circuitry; and
a connection module coupled to the first I/O, the second I/O and the output of the first UPS and coupled to the first I/O, the second I/O and the output of the second UPS, the connection module having an output that provides output power from at least one of the first UPS and the second UPS.

14. The UPS system of claim 13, wherein the connection module is configured to couple the second I/O of the first UPS to the first I/O of the second UPS to configure the first UPS for operation in the master mode of operation and to configure the second UPS in the controlled mode of operation.

15. The UPS system of claim 13, wherein each of the first UPS and the second UPS further includes a control input configured to receive the input control signal from the external device via the connection module in the controlled mode of operation and a control output to provide the output control signal in the master mode of operation.

16. The UPS system of claim 15, wherein the connection module is coupled to the control input and the control output of each of the first UPS and the second UPS and configured to couple the control input of the first UPS to the control output of the second UPS and to couple the control output of the first UPS to the control input of the second UPS.

17. The UPS system of claim 13, wherein each of the first UPS and the second UPS includes:
a bypass switch coupled to the input, the output and the control circuitry and operable under control of the control circuitry to selectively couple the input to the output to provide in a bypass mode of operation the input power from the first power source at the output bypassing the output power circuitry.

18. The UPS system of claim 17, wherein each of the first UPS and the second UPS includes a bypass input coupled to the control circuitry and configured to receive a bypass control signal, and wherein the control circuitry is further configured to inhibit bypass mode of operation based on a status of the bypass control signal.

19. The UPS system of claim 18, wherein each of the first UPS and the second UPS includes a bypass output, and wherein the connection module is configured to couple the bypass input of the first UPS to the bypass output of the second UPS and to couple the bypass output of the first UPS to the bypass input of the second UPS.

20. The UPS system of claim 13, wherein each of the first UPS and the second UPS includes a status input coupled to the control circuitry and configured to receive a status signal from the connection module, and wherein the control circuitry is configured to change an operational mode of the UPS from the controlled mode of operation to the master mode of operation based on a state of the status signal.

* * * * *